(12) United States Patent
Fisher et al.

(10) Patent No.: US 7,444,990 B1
(45) Date of Patent: Nov. 4, 2008

(54) FUEL LINE CHECK VALVE

(75) Inventors: Paul Fisher, Brighton, MI (US); Paul Mason, Dearborn, MI (US); Daniel Pangburn, Canton, MI (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/954,624

(22) Filed: Dec. 12, 2007

(51) Int. Cl.
F02M 69/00 (2006.01)
F02M 37/20 (2006.01)

(52) U.S. Cl. .................................. 123/459; 123/516

(58) Field of Classification Search ................ 123/459, 123/516, 506, 495
See application file for complete search history.

(56) References Cited

U.S. PATENT DOCUMENTS

| | | | |
|---|---|---|---|
| 1,693,355 A | 11/1928 | Thompson |
| 3,387,623 A | 6/1968 | Essig |
| 3,683,957 A | 8/1972 | Sands |
| 3,746,263 A | 7/1973 | Reeder et al. |
| 4,171,712 A | 10/1979 | DeForrest |
| 4,186,768 A | 2/1980 | Kuester |
| 4,274,380 A | 6/1981 | de Vulpillieres |
| 4,300,357 A | 11/1981 | Jacyno |
| 4,524,800 A | 6/1985 | Holland |
| 4,781,213 A | 11/1988 | Kilayko |
| 4,890,640 A | 1/1990 | King, Sr. |
| 4,972,869 A | 11/1990 | Takasaki |
| 5,036,823 A | 8/1991 | MacKinnon |
| 5,074,272 A | 12/1991 | Bostick et al. |
| 5,191,867 A | 3/1993 | Glassey |
| 5,339,785 A | 8/1994 | Wilksch |
| 5,361,742 A | 11/1994 | Briggs et al. |
| 5,477,829 A | 12/1995 | Hassinger et al. |
| 5,511,528 A | 4/1996 | Iwanaga et al. |
| 5,526,795 A | 6/1996 | Thompson et al. |
| 5,655,892 A | 8/1997 | Cherniawski et al. |
| 5,823,169 A | 10/1998 | Strohl et al. |
| 5,843,212 A | 12/1998 | Nanaji |
| 5,988,211 A | 11/1999 | Cornell |
| 6,047,686 A | 4/2000 | Bohringer et al. |
| 6,058,912 A | 5/2000 | Rembold et al. |
| 6,073,487 A | 6/2000 | Dawson |
| 6,530,364 B1 | 3/2003 | Romanek |
| 6,772,739 B2 | 8/2004 | Veinotte et al. |
| 6,772,741 B1 | 8/2004 | Pittel et al. |
| 6,837,219 B2 | 1/2005 | York et al. |
| 6,953,027 B2 | 10/2005 | Veinotte |

(Continued)

*Primary Examiner*—Stephen K. Cronin
*Assistant Examiner*—J. Page Hufty
(74) *Attorney, Agent, or Firm*—Michael Best & Friedrich LLP (57) ABSTRACT

A check valve includes a body defining a passageway through which fuel flows in a first fuel-flow direction during pump operation. The check valve also includes a seat, a seal member, and a biasing member biasing the seal member toward the seat. The seal member is movable between a first seated position in which the seal member is engaged with the seat and the pressure in the fuel rail is substantially equal to the operating pressure, and a second seated position in which the seal member is engaged with the seat and a residual pressure in the fuel rail is substantially less than the operating pressure. The seal member and the seat define a leak path between the fuel pump and the fuel rail permitting fuel to flow in a second fuel-flow direction opposite the first fuel-flow direction when the seal member is in the second seated position.

20 Claims, 9 Drawing Sheets

U.S. PATENT DOCUMENTS

| | | |
|---|---|---|
| 6,988,488 B2 | 1/2006 | Pursifull et al. |
| 7,011,077 B2 | 3/2006 | Veinotte |
| 7,066,152 B2 | 6/2006 | Stroia et al. |
| 7,069,915 B2 | 7/2006 | Brandenburg et al. |
| 7,225,796 B2 | 6/2007 | Reddy et al. |
| 7,246,607 B2 * | 7/2007 | Burke et al. ................ 123/516 |
| 2004/0250795 A1 | 12/2004 | Stroia et al. |
| 2006/0260587 A1 | 11/2006 | Woody |
| 2007/0006849 A1 | 1/2007 | Mashiki |

* cited by examiner

FUEL LINE CHECK VALVE

FIELD OF THE INVENTION

The present invention relates to fuel systems, and more particularly to fuel pressure relief valves in fuel systems.

BACKGROUND OF THE INVENTION

Fuel leakage in automotive fuel systems may occur during periods of non-operation of the automobile. Such leakage may occur through fuel injectors, or through various components in the fuel system by permeation, because most modern fuel injection systems remain pressurized after the automobile is turned off. Maintaining fuel pressure in the fuel system after an automobile is turned off is a common practice of automotive manufacturers to maintain the readiness of the fuel system for quick engine restarting (i.e., "hot-restarts"), and also to minimize emissions during restart and avoid delays in restarting.

Fuel leakage is particularly exacerbated by diurnal temperature cycles. During a typical day, the temperature rises to a peak during the middle of the day. In conjunction with this temperature rise, the pressure in the fuel system of a non-operating automobile also increases, often resulting in leakage through the fuel injectors and other fuel system components. This temperature cycle repeats each day, thus often resulting in a repeated cycle of fuel leakage and evaporative emissions.

SUMMARY OF THE INVENTION

Relieving fuel system pressure during such diurnal temperature cycles can reduce fuel leakage and evaporative emissions from the fuel system.

The present invention provides, in one aspect, a check valve configured for use in a fuel system including a fuel pump, a fuel rail that receives pressurized fuel from the fuel pump at an operating pressure, and a fuel line fluidly communicating the fuel pump and the fuel rail. The check valve includes a body defining a passageway therein. The passageway has an inlet end in fluid communication with the fuel pump and an outlet end in fluid communication with the fuel rail such that pressurized fuel flows in a first fuel-flow direction from the inlet end of the passageway to the outlet end of the passageway during fuel pump operation. The check valve also includes a seat coupled to the body, a seal member moveable relative to the seat and selectively engageable with the seat, and a biasing member biasing the seal member toward the seat. The seal member is movable between an unseated position during fuel pump operation, a first seated position in which the seal member is engaged with the seat and the fuel pressure in the fuel rail is substantially equal to the operating pressure after the fuel pump has been turned off, and a second seated position in which the seal member is engaged with the seat and a residual fuel pressure in the fuel rail is substantially less than the operating pressure after the fuel pump has been turned off. The seal member and the seat define a leak path between the fuel pump and the fuel rail permitting fuel to flow in a second fuel-flow direction opposite the first fuel-flow direction when the seal member is in the second seated position.

The present invention provides, in another aspect, a fuel system including a fuel pump operable to discharge pressurized fuel at an operating pressure, a fuel rail that receives pressurized fuel from the fuel pump, and a body defining a passageway therein. The passageway has an inlet end in fluid communication with the fuel pump and an outlet end in fluid communication with the fuel rail such that pressurized fuel flows in a first fuel-flow direction from the inlet end of the passageway to the outlet end of the passageway during fuel pump operation. The fuel system also includes a seat coupled to the body, a seal member moveable relative to the seat and selectively engageable with the seat, and a biasing member biasing the seal member toward the seat. The seal member is movable between an unseated position during fuel pump operation, a first seated position in which the seal member is engaged with the seat and the fuel pressure in the fuel rail is substantially equal to the operating pressure after the fuel pump has been turned off, and a second seated position in which the seal member is engaged with the seat and a residual fuel pressure in the fuel rail is substantially less than the operating pressure after the fuel pump has been turned off. The seal member and the seat define a leak path between the fuel pump and the fuel rail permitting fuel to flow in a second fuel-flow direction opposite the first fuel-flow direction when the seal member is in the second seated position.

Other features and aspects of the invention will become apparent by consideration of the following detailed description and accompanying drawings.

BRIEF DESCRIPTION OF THE DRAWINGS

FIG. 5a is a view of a portion of the fuel line check valve of FIG. 4a from viewing plane 5a-5a.

FIG. 8 is a side view of a portion of the fuel line check valve of FIG. 7a.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

DETAILED DESCRIPTION

Figure 1:
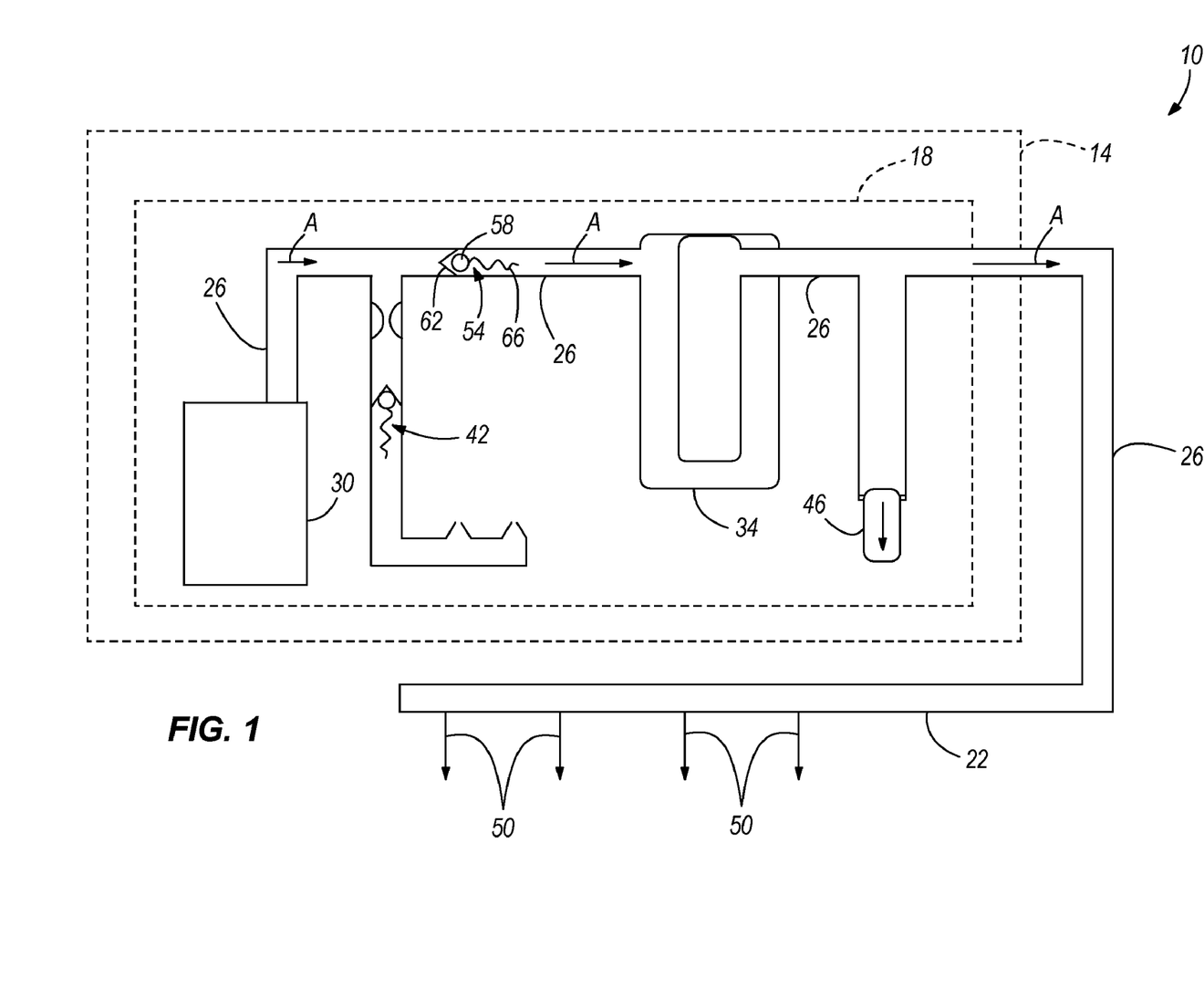
FIG. 1 is a schematic view of a fuel system incorporating a fuel line check valve of the present invention, illustrating the fuel system in operation.
Figure 2:
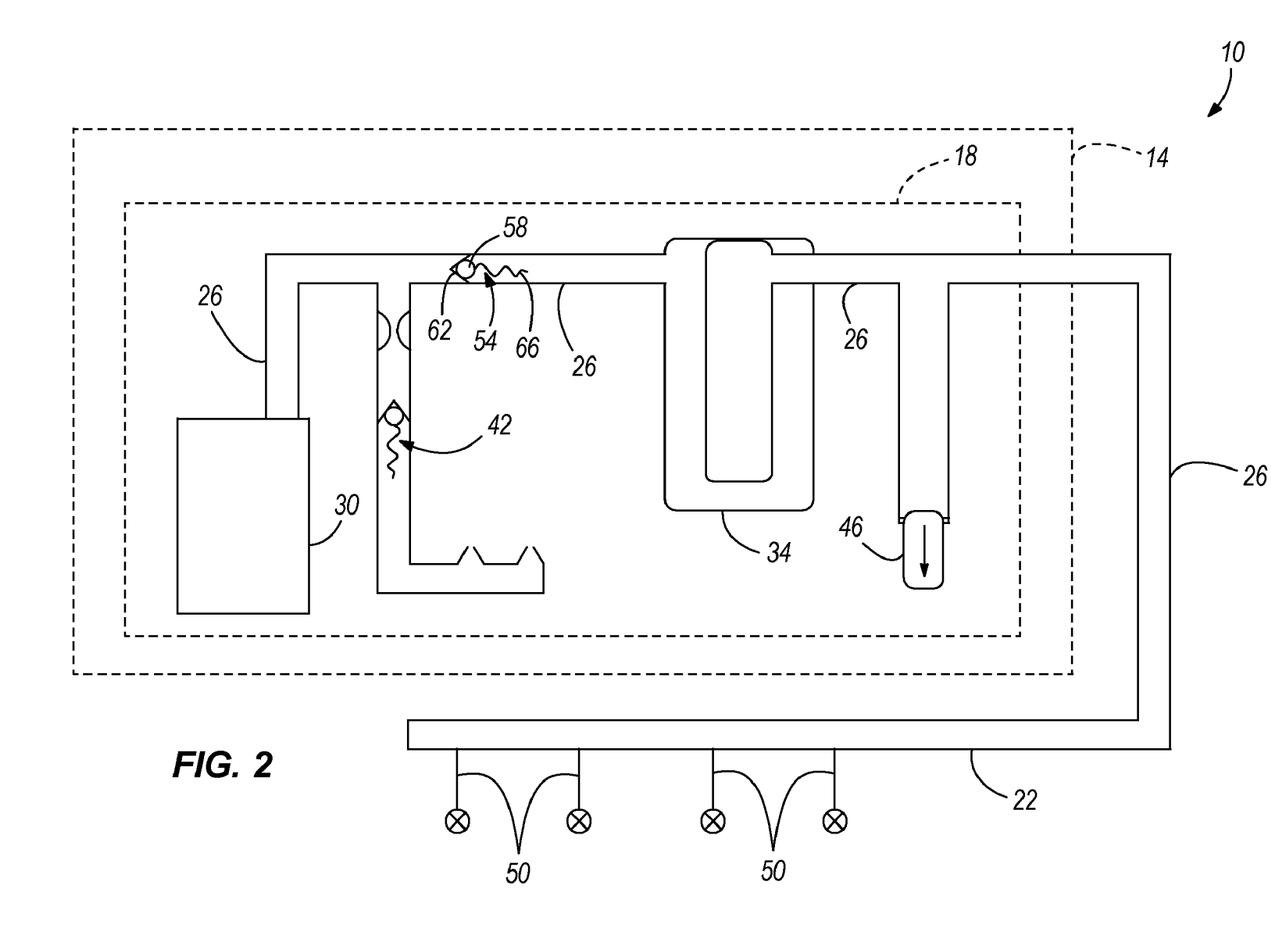
FIG. 2 is a schematic view of the fuel system of FIG. 1, illustrating the fuel system immediately after deactivation of the system.
Figure 3:
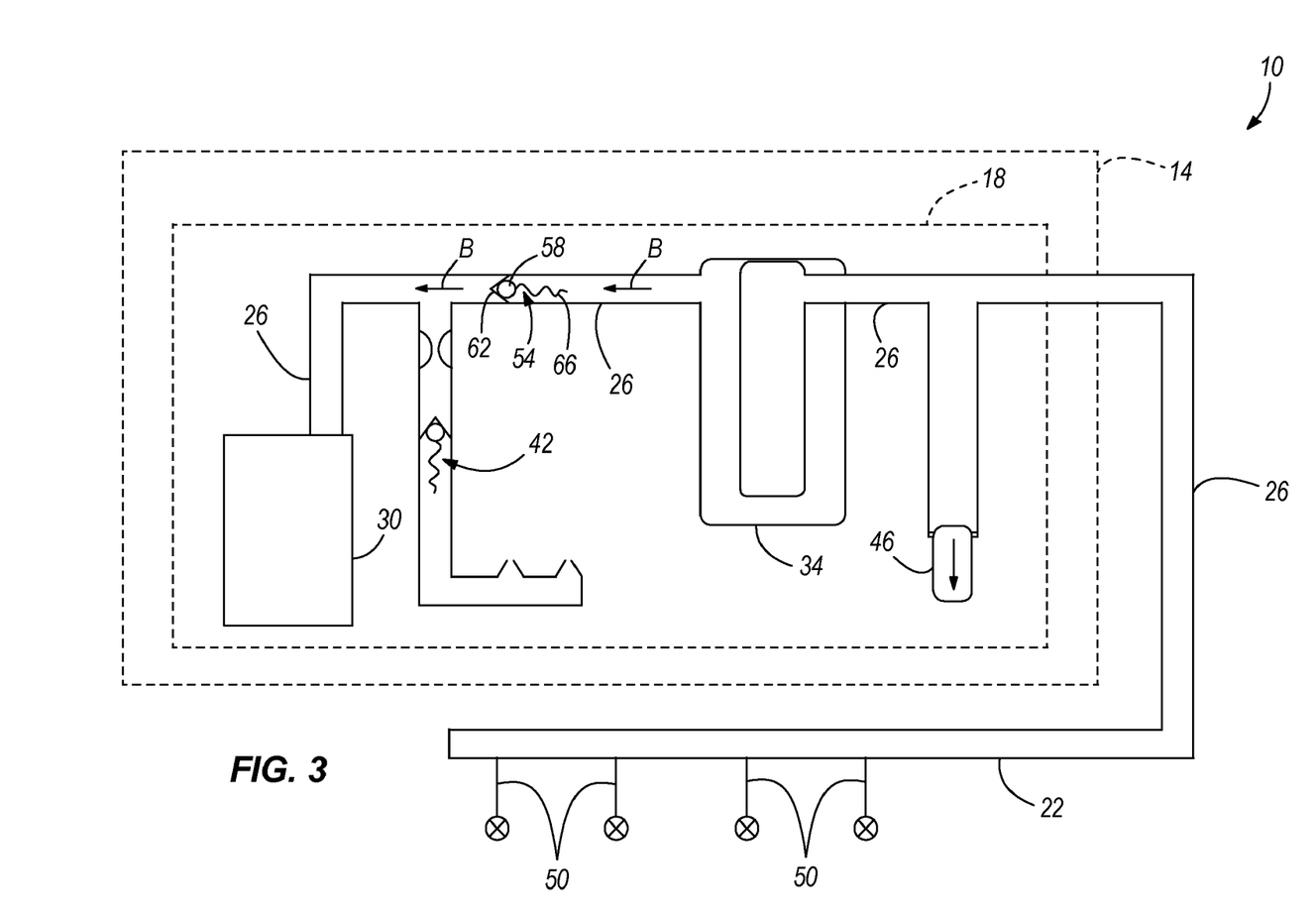
FIG. 3 is a schematic view of the fuel system of FIG. 1, illustrating the deactivated fuel system after a diurnal temperature cycle.

FIGS. 1-3 schematically illustrate a fuel system 10 including a fuel tank 14, a fuel pump module 18 positioned in the fuel tank 14, a fuel rail 22 coupled to an engine, and a fuel line 26 fluidly communicating the fuel pump module 18 and the fuel rail 22. The fuel pump module 18 includes a fuel pump 30 and a fuel filter 34 in fluid communication with the fuel line 26, a portion of which is contained within the fuel pump module 18. The fuel pump module 18 also includes a rollover check valve 42 and a fuel pressure relief valve 46 in fluid communication with the fuel line 26.

In a conventional manner, the fuel pump 30, during operation, discharges pressurized fuel at an operating pressure through the portion of the fuel line 26 between the fuel pump 30 and the fuel filter 34. Fuel then flows through the fuel filter 34 and through the rest of the fuel line 26 to fill the fuel rail 22 with pressurized fuel. Depending on the engine with which the fuel system 10 is utilized, the operating pressure of the fuel discharged by the pump 30 may be between about 1 bar (100 kPa) and about 6 bars (600 kPa). Fuel injectors 50 fluidly connected to the fuel rail 22 transfer the pressurized fuel in the fuel rail 22 to the engine for consumption. Also, in a conventional manner, the rollover check valve 42 closes to substantially prevent fuel in the fuel tank 14 from leaking into the fuel line 26 in the event of a vehicle rollover. Further, in a conventional manner, the fuel pressure relief valve 46 opens in the event that a blockage in the fuel system 10, during operation of the fuel system 10, causes the pressure in the fuel line 26 and fuel rail 22 to rise above the predetermined relief level of the fuel pressure relief valve 46.

With continued reference to FIGS. 1-3, the fuel system 10 also includes a check valve 54 in fluid communication with the fuel line 26 between the fuel pump 30 and the fuel filter 34. The check valve 54 includes a seal member 58 which, in FIGS. 1-3, is schematically illustrated as a spherical ball that is selectively engageable with a conical seat 62. The check valve 54 also includes a biasing member 66 which, in FIGS. 1-3, is schematically illustrated as a compression spring. The seal member 58 is movable between an unseated position during fuel pump operation (see FIG. 1), a first seated position in which the seal member 58 is engaged with the seat 62 to substantially prevent fuel in the fuel line 26 or fuel rail 22 from leaking back into the fuel tank 14 after the fuel pump 30 has been turned off (see FIG. 2), and a second seated position in which the seal member 58 is engaged with the seat 62 yet allows fuel in the fuel line 26 and fuel rail 22 to leak back into the fuel tank 14 after the fuel pump 30 has been turned off (see FIG. 3). As will be discussed in greater detail below, the seal member 58 and the seat 62 may include a number of different constructions to facilitate operation of the check valve 54 in this manner.

Figure 4A:
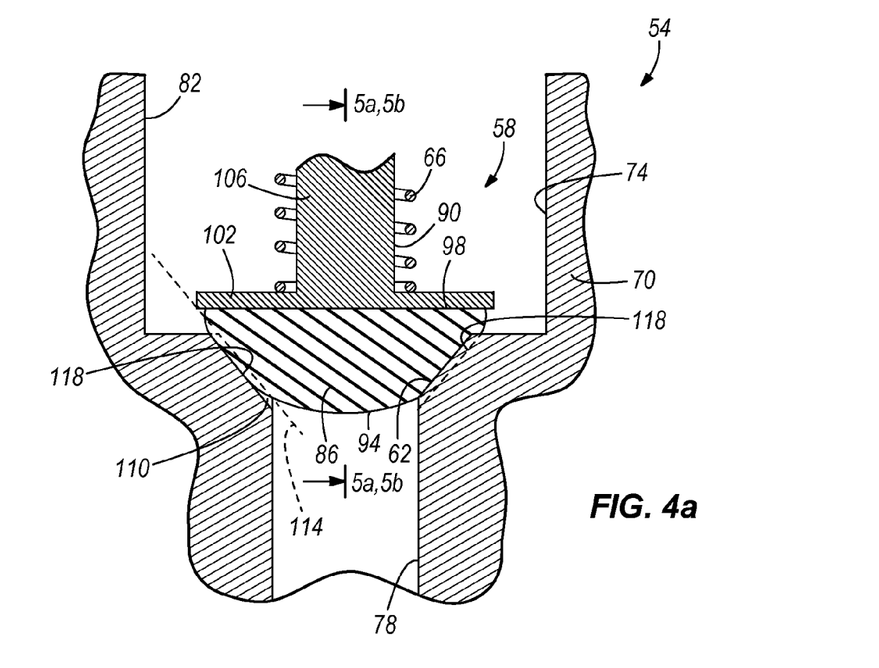
FIG. 4a is a partial cross-sectional view of a first construction of the fuel line check valve of FIG. 1, illustrating the valve in a first seated position.
Figure 4B:
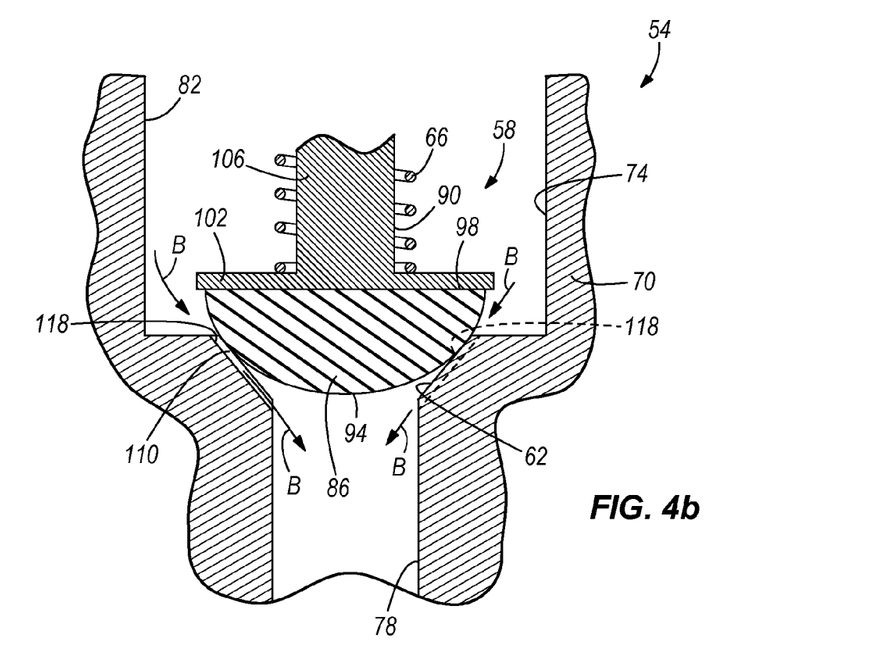
FIG. 4b is a partial cross-sectional view of the fuel line check valve of FIG. 4a, illustrating the valve in a second seated position.

FIGS. 4a and 4b illustrate a first construction of the check valve 54. With reference to FIG. 4a, the check valve 54 includes a body 70 defining a passageway 74 therein. The passageway 74 has an inlet end 78 in fluid communication with the fuel pump 30 and the portion of the fuel line 26 upstream of the check valve 54 with respect to the fuel-flow direction indicated by arrows A (see also FIG. 1). The passageway 74 also has an outlet end 82 in fluid communication with the fuel rail 22 and the portion of the fuel line 26 downstream of the check valve 54 with respect to the fuel-flow direction indicated by arrows A. In the illustrated construction of the check valve 54, the seat 62 is integrally formed with the body 70 and is positioned between the inlet end 78 and the outlet end 82 of the passageway 74. However, in alternative constructions of the check valve 54, the seat 62 may be a separate and distinct component from the body 70 and may be coupled to the body 70 in any of a number of different ways.

With continued reference to FIGS. 4a and 4b, the seal member 58 is configured as a resiliently deformable seal 86 coupled to a support member 90. In the illustrated construction of the check valve 54, the seal 86 is configured with a substantially rounded or hemispherical sealing surface 94 and a substantially flat mounting surface 98. Also, in the illustrated construction of the check valve 54, the support member 90 is configured as a plate 102 upon which the mounting surface 98 of the seal 86 is coupled, and a stem 106 extending from the plate 102. The mounting surface 98 of the seal 86 may be coupled to the plate 102 in any of a number of different ways (e.g., for example, using adhesives or overmolding the support member 90 with the seal 86). The seal 86 may be made from any of a number of resiliently deformable materials (e.g., for example, fluorocarbon rubber or another elastomeric material).

Figure 5A:
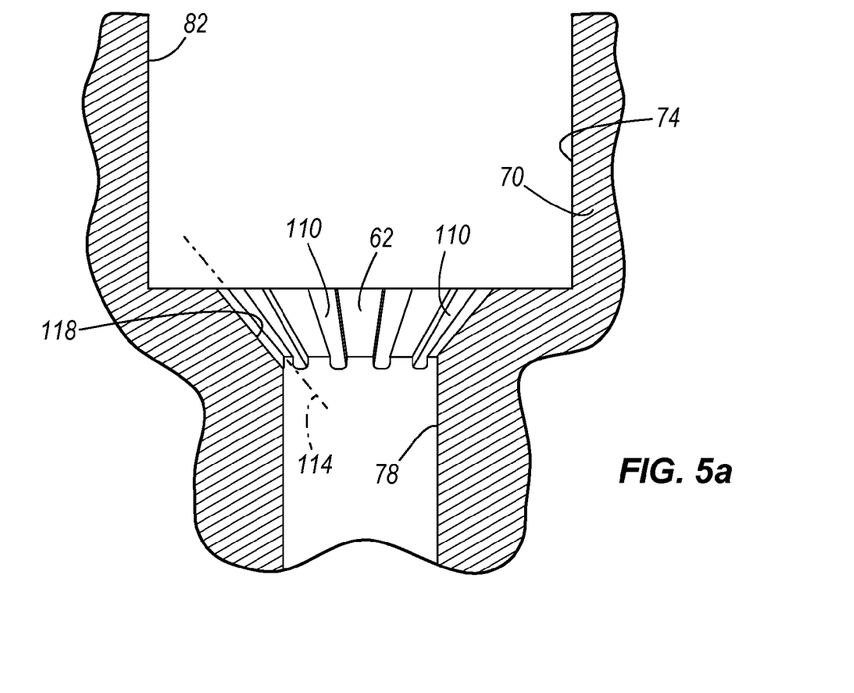

With reference to FIG. 5a, the body 70 includes one or more substantially radially-extending grooves 110 extending from the radially-outermost extent of the seat 62 to the radially-innermost extent of the seat 62. As shown in FIGS. 4a and 5a, the seat 62 defines a plane 114, and the grooves 110 each include a sealing surface 118 spaced from the plane 114 in a fuel-flow direction indicated by arrows B in FIG. 3. As such, when the seal member 58 is in the first seated position (see FIG. 4a), the seal 86 engages the seat 62 and the sealing surface 118 of each of the grooves 110 to substantially prevent fuel from flowing through the check valve 54 in a fuel-flow direction indicated by arrows B in FIG. 3. Further, when the seal member 58 is in the second seated position (see FIG. 4b), the seal 86 is unseated from the sealing surface 118 of each of the grooves 110, thereby providing a leak path between the fuel rail 22 and the fuel pump 30 and permitting fuel to leak past the seal 86, through the grooves 110, and back into the fuel pump 30 and the fuel tank 14 in the fuel-flow direction indicated by arrows B in FIGS. 3 and 4b.

With reference to FIG. 4b, the spring rate of the biasing member 66 is selected to provide a force sufficient to urge the seal 86 against the seat 62 when the fuel pump 30 is not in operation, without substantially deforming the seal 86. As such, an additional force, provided by the static fuel pressure in the fuel line 26 and the fuel rail 22 when the fuel pump 30 is not in operation, is required to urge the seal 86 against the sealing surface 118 of each of the grooves 110 to maintain the seal 86 in the first seated position (see FIG. 4a). As shown in FIG. 4a, the seal 86 is substantially deformed to engage both the seat 62 and the sealing surface 118 of each of the groove 110s. When the seal 86 is deformed in this manner, potential energy is stored in the seal 86 that, once used, allows the seal 86 to resume its substantially undeformed shape shown in FIG. 4b. The seal 86 therefore behaves similarly to a compression spring, and the seal 86 may be configured with different spring rates depending upon the particular shape, size, and material of the seal 86.

Figure 5B:
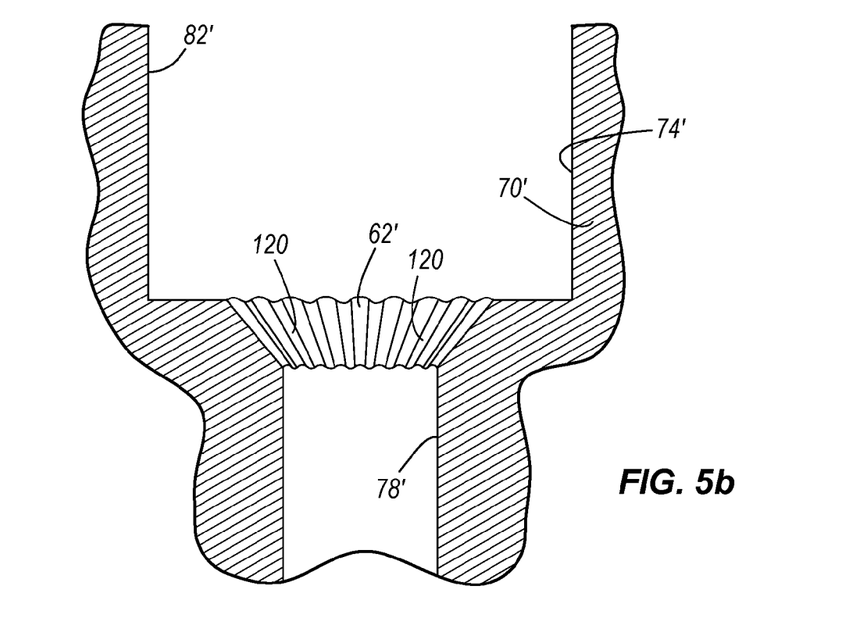
FIG. 5b is a view of a portion of a second construction of the fuel line check valve of FIG. 1 from viewing plane 5b-5b in FIG. 4a FIG. 6a is a partial cross-sectional view of a third construction of the fuel line check valve of FIG. 1, illustrating the valve in a first seated position.

In an alternative construction of the check valve 54, with like components being labeled with like reference numerals with a single prime superscript, the seat 62' may be undulated to define at least one valley portion 120 (see FIG. 5b) that is engaged by the seal 86 when the seal member 58 is in the first seated position, and is spaced from the seal 86 when the seal member 58 is in the second seated position. As such, the leak path between the fuel pump 30 and the fuel rail 22 may be defined between the seal 86 and the valley portion 120 of the seat 62' when the seal member 58 is in the second seated position. Such a construction of the check valve utilizing the body 70' appears similar in cross-section to the check valve 54 illustrated in FIGS. 4a and 4b, and functions in substantially the same manner as the check valve 54 of FIGS. 4a and 4b.

FIG. 1 illustrates the fuel system 10 in an operational state. As discussed above, the fuel pump 30 discharges pressurized fuel at an operating pressure in a fuel-flow direction (indicated by arrows A) through the portion of the fuel line 26 between the fuel pump 30 and the fuel filter 34. Fuel flowing through the fuel line 26 thereby maintains the seal member 58 in the unseated position with respect to the seat 62 in the check valve 54. Fuel flows through the fuel filter 34 and through the remainder of the fuel line 26 to fill the fuel rail 22 with pressurized fuel.

With reference to FIG. 2, the fuel system 10 is shown immediately after deactivation or "key-off" of a vehicle's ignition system. Following key-off of the vehicle's ignition system, the fuel pump 30 is deactivated to cease discharge of pressurized fuel in the fuel-flow direction indicated by arrows A to the fuel line 26, and the fuel injectors 50 are also deactivated to cease transfer of pressurized fuel in the fuel rail 22 to the engine. As a result, the flow of fuel in the fuel line 26 stops, and the biasing member 66 and the static fuel pressure in the fuel line 26 and the fuel rail 22 moves the seal member 58 to the first seated position (see FIG. 4a) in which the seal 86 is substantially deformed to engage the seat 62 and the sealing surfaces 118 of the grooves 110. Back-flow of fuel to the fuel tank 14 is substantially prevented by the now-closed check valve 54. As a result, the fuel trapped in the fuel line 26 and the fuel rail 22 is maintained at a pressure substantially equal to or slightly greater than the operating pressure of fuel in the fuel line 26 and the fuel rail 22 during operation of the fuel pump 30 in anticipation of a hot-restart. As discussed above, such a static pressure in the fuel line 26 and the fuel rail 22 provides the additional force necessary to urge the seal 86 against the sealing surface 118 of each of the grooves 110 (thereby substantially deforming the seal) to substantially prevent the trapped fuel from leaking back into the fuel pump 30 and the fuel tank 14.

With reference to FIG. 3, the deactivated fuel system 10 is shown after the occurrence of a diurnal temperature cycle. As discussed above, diurnal temperature cycles cause the residual static pressure in the fuel line 26 and the fuel rail 22 to fluctuate with the rising and falling temperatures of a diurnal temperature cycle. During the cool-down period of a diurnal temperature cycle, the trapped fuel in the fuel line 26 and fuel rail 22 cools and as a result, the residual static pressure in the fuel line 26 and fuel rail 22 decreases. When the residual static pressure in the fuel line 26 and fuel rail 22 drops to a predetermined pressure value at which the potential energy stored in the substantially deformed seal 86 is sufficient to overcome the forces exerted by the biasing member 66 and the residual static pressure in the fuel line 26 and the fuel rail 22, the seal 86 resumes its substantially undeformed shape and moves the seal member 58 from the first seated position to the second seated position to provide a leak path (indicated by arrows B) between the fuel pump 30 and the fuel rail 22 in a second fuel-flow direction opposite the fuel-flow direction indicated by arrows A during fuel pump operation (see FIG. 1).

In the illustrated construction of the check valve 54, the spring rates of the seal 86 and the biasing member 66 are selected to unseat the seal 86 from the sealing surface 118 of each of the grooves 110 when the residual static pressure of fuel in the fuel rail 22 and fuel in the portion of the fuel line 26 downstream of the check valve 54 (with respect to the fuel-flow direction indicated by arrows A in FIG. 1) is about 15 kPa. Alternatively, the spring rates of the seal 86 and the biasing member 66 may be selected to unseat the seal 86 from the sealing surface 118 of each of the grooves 110 when the residual static pressure of fuel in the fuel rail 22 and fuel in the portion of the fuel line 26 downstream of the check valve 54 is between about 10 kPa and about 100 kPa, or in other constructions of the check valve 54 between about 10 kPa and about 50 kPa. The seal member 58, when in the second seated position shown in FIG. 4b, substantially limits the flow of fuel in the fuel-flow direction indicated by arrows B in FIG. 3 to about 14.4 mL/minute or less when the pressure in the fuel rail 22 is about 10 kPa.

With reference to FIG. 3, immediately after the seal 86 is unseated from the sealing surface 118 of each of the grooves 110, the pressure differential between the portion of the fuel line 26 downstream of the check valve 54 (with respect to the fuel-flow direction indicated by arrows A in FIG. 1) and the portion of the fuel line 26 upstream of the check valve 54 (with respect to the fuel-flow direction indicated by arrows A in FIG. 1) causes some of the fuel in the fuel line 26 to back-flow through the check valve 54 as described above and leak back to the fuel pump 30 and the fuel tank 14. Such back-flow through the check valve 54 substantially ceases when the residual static pressure in the fuel line 26 equalizes with the pressure in the fuel tank 14, which initially is at about 0 kPa before the opening of the check valve 54. The check valve 54 remains open as shown in FIG. 4b during subsequent diurnal temperature cycles to substantially prevent the build-up of pressure in the fuel line 26 or the fuel rail 22, thereby reducing fuel leakage and the associated evaporative emissions from the components of the fuel system (e.g., the fuel injectors 50).

Upon reactivation of the fuel system 10 from the non-operational state shown in FIG. 3, the fuel pump 30 discharges pressurized fuel through the fuel line 26 to re-open the check valve 54 such that the fuel system 10 again resembles the operational state shown in FIG. 1.

Figure 6A:
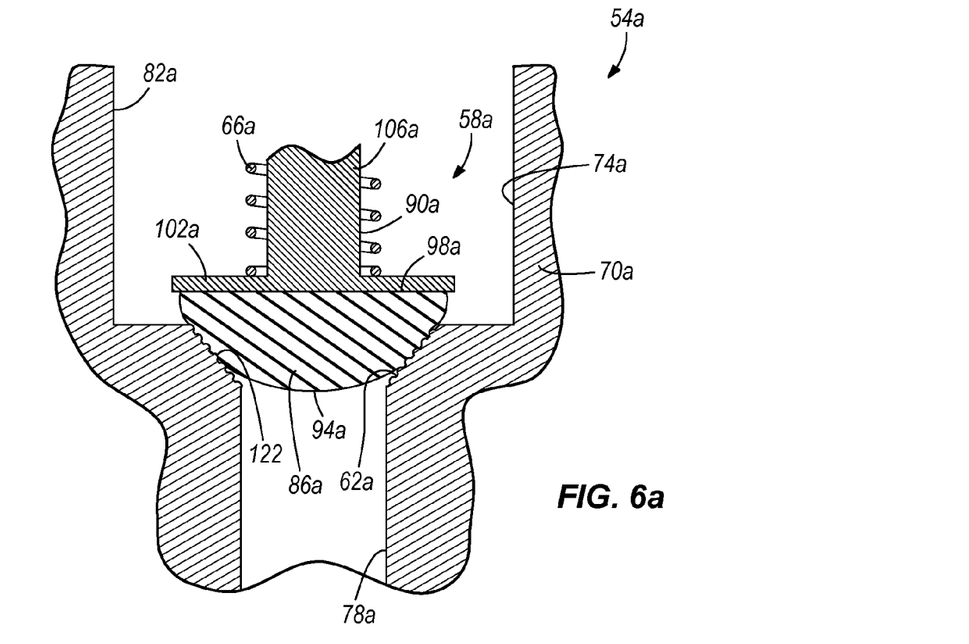
Figure 6B:
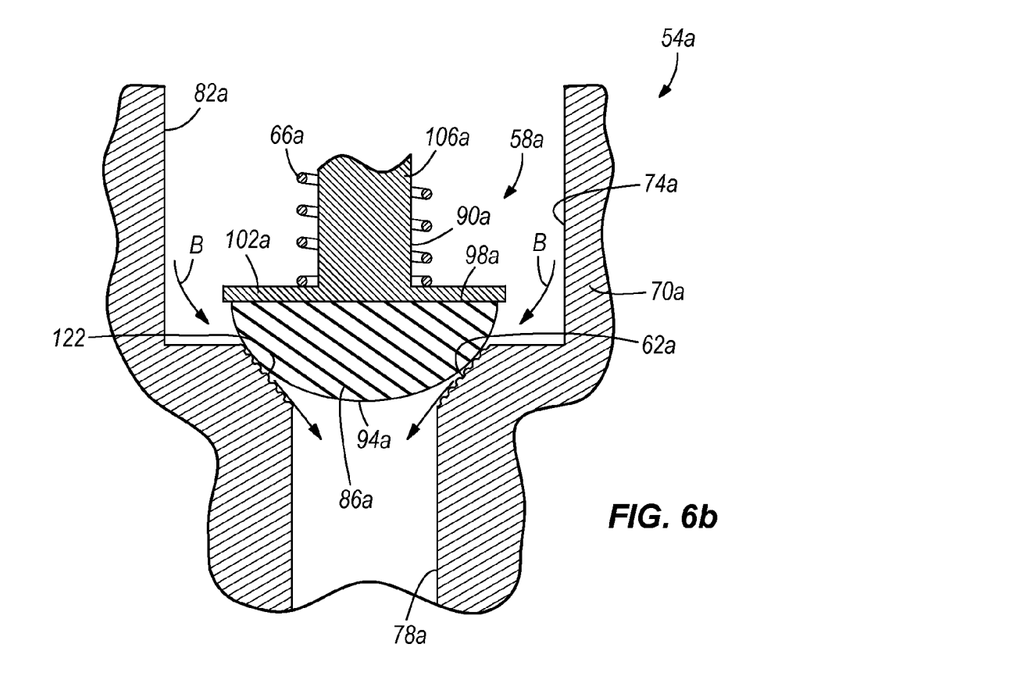
FIG. 6b is a partial cross-sectional view of the fuel line check valve of FIG. 6a, illustrating the valve in a second seated position.

FIGS. 6a and 6b illustrate another construction of the check valve 54a, with like components and like features being labeled with like reference numerals, with the letter "a" added. The check valve 54a includes a substantially conical seat 62a having a rough surface texture 122 (e.g., for example, a knurled or bumpy surface), which defines a plurality of high and low surfaces or high or low spots on the seat 62a. However, alternative constructions of the check valve 54*a* may incorporate rough surface textures having different configurations.

A chain of low spots or surfaces on the seat 62*a*, extending from the radially-outermost extent of the seat 62*a* to the radially-innermost extent of the seat 62*a*, defines a channel or a path through which fuel may flow in the fuel-flow direction indicated by arrows B in FIGS. 3 and 6*b*. When the seal member 86*a* is in the first seated position (see FIG. 6*a*), the seal 86*a* engages the seat 62*a* and is substantially deformed to close the channels or paths defined by the chain of low spots or low surfaces in the rough surface texture 122 to substantially prevent fuel from flowing through the check valve 54*a* in a fuel-flow direction indicated by arrows B in FIG. 3. Further, when the seal member 58*a* is in the second seated position (see FIG. 6*b*), the seal 86*a* has resumed its substantially undeformed shape thereby opening the channels or paths defined by the chain of low spots or low surfaces in the rough surface texture 122, providing a leak path between the fuel rail 22 and the fuel pump 30. Fuel is then permitted to leak past the seal 86*a*, through the chain of low spots or low surfaces in the rough surface texture 122 on the seat 62*a*, and back into the fuel pump 30 and the fuel tank 14 in the fuel-flow direction indicated by arrows B in FIGS. 3 and 6*b*. The operation of the check valve 54*a* with respect to the operational modes of the fuel system 10 schematically illustrated in FIGS. 1-3 is substantially similar to the operation of the check valve 54 discussed above.

Figure 7A:
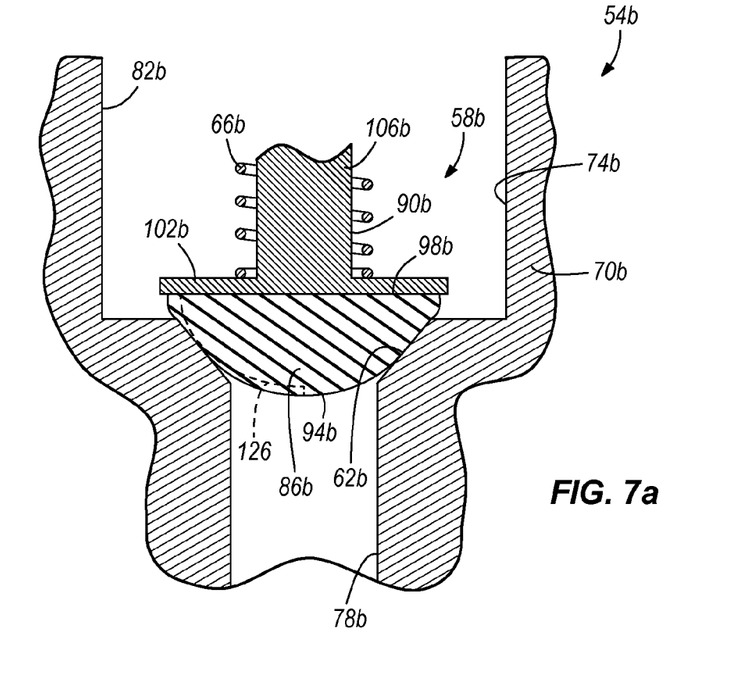
FIG. 7a is a partial cross-sectional view of a fourth construction of the fuel line check valve of FIG. 1, illustrating the valve in a first seated position.
Figure 7B:
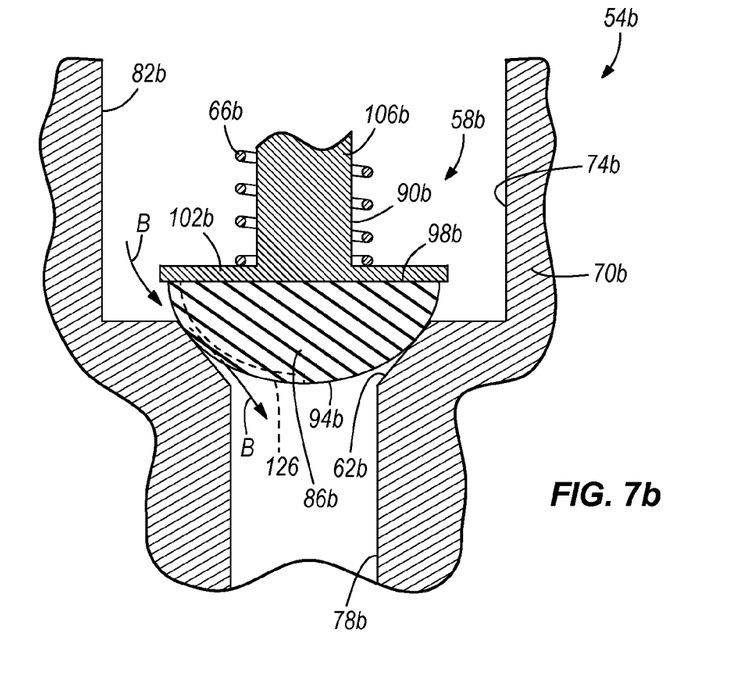
FIG. 7b is a partial cross-sectional view of the fuel line check valve of FIG. 7a, illustrating the valve in a second seated position.
Figure 8:
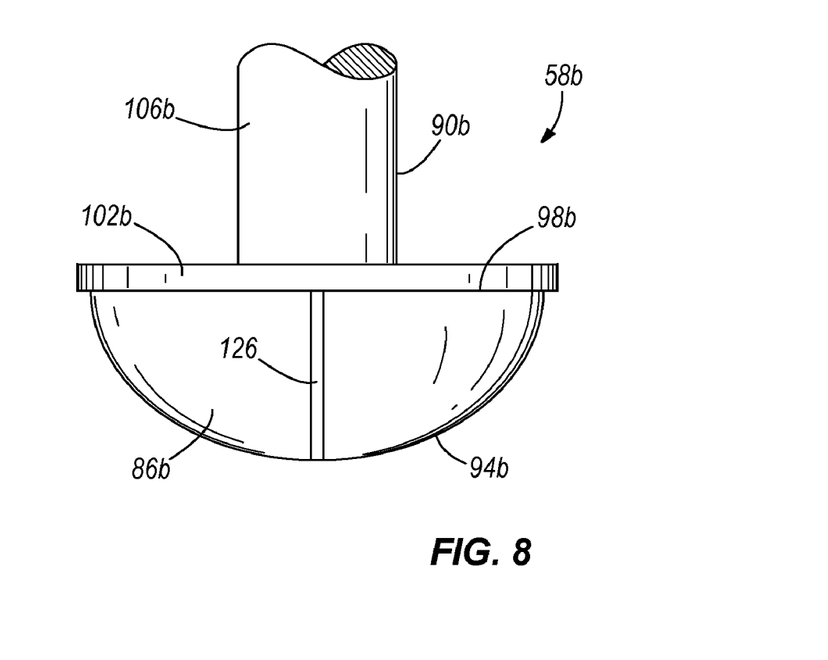
Figure 9:
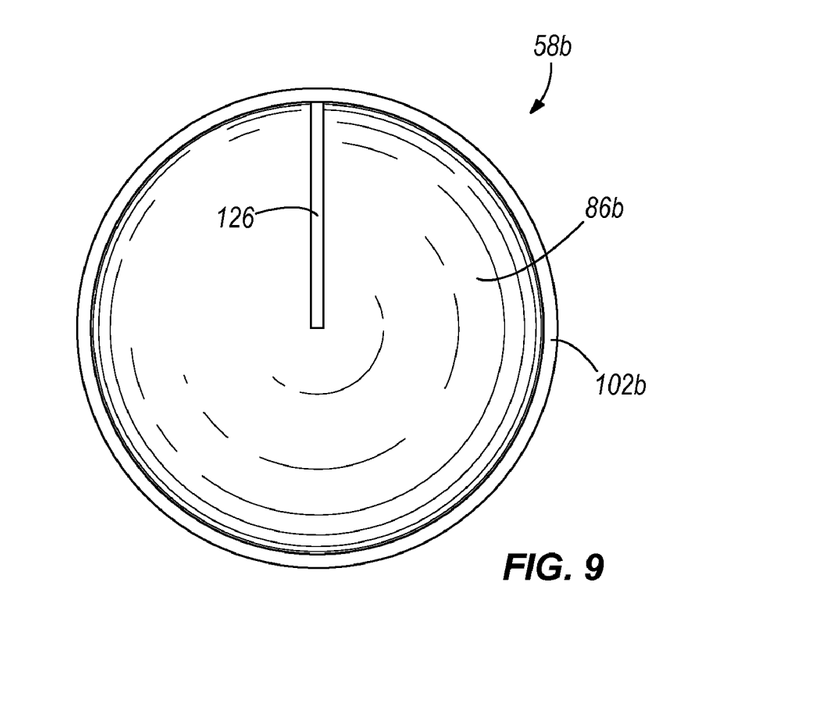
FIG. 9 is an end view of the portion of the fuel line check valve of FIG. 8.

FIGS. 7*a* and 7*b* illustrate yet another construction of the check valve 54*b*, with like components and like features being labeled with like reference numerals, with the letter "b" added. The check valve 54*b* includes a substantially conical seat 62*b* and a seal 86*b* having at least one substantially radially-extending groove 126 in the sealing surface 94*b* (see also FIGS. 8 and 9). The groove 126 in the sealing surface 94*b* defines a channel or a path through which fuel may flow in the fuel-flow direction indicated by arrows B in FIGS. 3 and 10. Alternatively, the seal 86*b* may incorporate two or more grooves 126 to provide multiple channels or paths through which fuel may flow in the fuel-flow direction indicated by arrows B in FIGS. 3 and 10.

When the seal member 58*b* is in the first seated position (see FIG. 7*a*), the seal 86*b* engages the seat 62*c* and is substantially deformed to close the channel or path defined by the groove 126 in the sealing surface 94*b* of the seal 86*b* to substantially prevent fuel from flowing through the check valve 54*b* in a fuel-flow direction indicated by arrows B in FIG. 3. Further, when the seal member 58*b* is in the second seated position (see FIG. 7*b*), the seal 86*b* has resumed its substantially undeformed shape thereby opening the channel or path defined by the groove 126 in the sealing surface 94*b* of the seal 86*b*, providing a leak path between the fuel rail 22 and the fuel pump 30. Fuel is then permitted to leak past the seal 86*b*, through the channel or path defined by the groove 126, and back into the fuel pump 30 and the fuel tank 14 in the fuel-flow direction indicated by arrows B in FIGS. 3 and 10. The operation of the check valve 54*b* with respect to the operational modes of the fuel system 10 schematically illustrated in FIGS. 1-3 is substantially similar to the operation of the check valves 54, 54*a* discussed above.

Figure 10A:
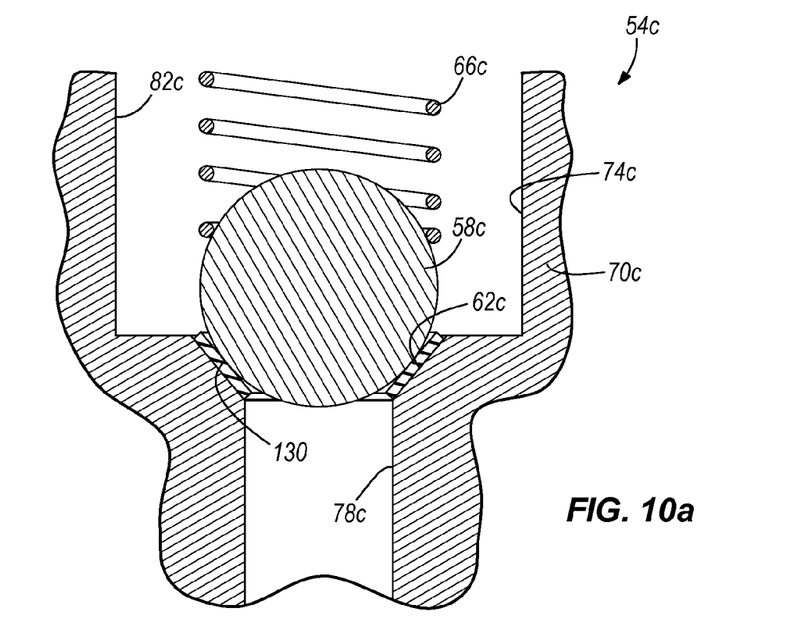
FIG. 10a is a partial cross-sectional view of a fifth construction of the fuel line check valve of FIG. 1, illustrating the valve in a first seated position.
Figure 10B:
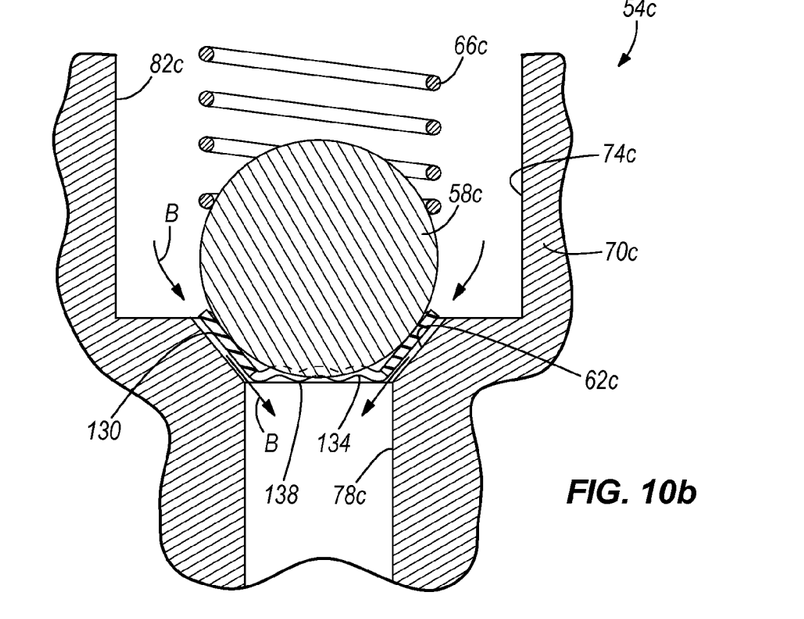
FIG. 10b is a partial cross-sectional view of the fuel line check valve of FIG. 10a, illustrating the valve in a second seated position.

FIGS. 10*a* and 10*b* illustrate yet another construction of the check valve 54*c*, with like components and like features being labeled with like reference numerals, with the letter "c" added. The check valve 54*c* includes a two-piece seat including a substantially conical first seat portion 62*c* and a resiliently deformable, second seat portion configured as a conical wave or spring washer 130 positioned adjacent the seat portion 62*c* against which the seal member 58*c* is biased. Although the seal member 58*c* is shown as a spherical ball in FIGS. 10*a* and 10*b*, the seal member 58*c* may alternatively be configured in any of a number of different ways.

As shown in FIG. 10*b*, the washer 130 defines a plurality of hill portions 134 spaced from the seat portion 62*c* and a plurality of valley portions 138 engaged with the seat portion 62*c*. In the illustrated construction of the check valve 54*c*, the washer 130 is shown as a separate and distinct component from the seat portion 62*c*. Alternatively, the washer 130 may be integrally formed with the seat portion 62*c* as an overmold or an inlay with the body 70*c*.

When the seal member 58*c* is in the first seated position (see FIG. 10*a*), the seal member 58*c* engages and substantially deforms the washer 130 to flatten the washer 130 against the seat portion 62 to close the channels or paths defined between the seat portion 62*c* and the hill portions, and the channels or paths defined between the valley portions and the seal member 58*c* to substantially prevent fuel from flowing through the check valve 54*c* in a fuel-flow direction indicated by arrows B in FIG. 3. Further, when the seal member 58*c* is in the second seated position (see FIG. 10*b*), the washer 130 has resumed its substantially undeformed shape thereby opening the channels or paths defined between the seat portion 62*c* and the hill portions, and the channels or paths defined between the valley portions and the seal member 58*c*, providing a leak path between the fuel rail 22 and the fuel pump 30. Fuel is then permitted to leak past the seal member 58*c*, through the channels or paths defined between the seat portion 62*c* and the hill portions, and the channels or paths defined between the valley portions and the seal member 58*c*, and back into the fuel pump 30 and the fuel tank 14 in the fuel-flow direction indicated by arrows B in FIGS. 3 and 10*b*. The operation of the check valve 54*c* with respect to the operational modes of the fuel system 10 schematically illustrated in FIGS. 1-3 is substantially similar to the operation of the check valves 54, 54*a*, and 54*b* discussed above.

The illustrated check valves 54, 54*a*, 54*b*, 54*c* represent only some possible check valve geometries. Those skilled in the art will understand other configurations can also be used to achieve the same results.

Various features of the invention are set forth in the following claims.

What is claimed is:

1. A check valve configured for use in a fuel system including a fuel pump, a fuel rail that receives pressurized fuel from the fuel pump at an operating pressure, and a fuel line fluidly communicating the fuel pump and the fuel rail, the check valve comprising:

a body defining a passageway therein, the passageway having an inlet end in fluid communication with the fuel pump and an outlet end in fluid communication with the fuel rail such that pressurized fuel flows in a first fuel-flow direction from the inlet end of the passageway to the outlet end of the passageway during fuel pump operation;

a seat coupled to the body;

a seal member moveable relative to the seat and selectively engageable with the seat; and a biasing member biasing the seal member toward the seat; wherein the seal member is movable between an unseated position during fuel pump operation, a first seated position in which the seal member is engaged with the seat and the fuel pressure in the fuel rail is substantially equal to the operating pressure after the fuel pump has been turned off, and a second seated position in which the seal member is engaged with the seat and a residual fuel pressure in the fuel rail is substantially less than the operating pressure after the fuel pump has been turned off; and wherein the seal member and the seat define a leak path between the fuel pump and the fuel rail permitting fuel to flow in a second fuel-flow direction opposite the first fuel-flow direction when the seal member is in the second seated position.

2. The check valve of claim 1, wherein the seat defines a plane, and wherein the check valve further includes a sealing surface spaced from the plane in the second fuel-flow direction and engaged by the seal member when the seal member is in the first seated position.

3. The check valve of claim 2, wherein the seal member is spaced from the sealing surface when the seal member is in the second seated position, and wherein the leak path between the fuel pump and the fuel rail is defined between the seal member and the sealing surface.

4. The check valve of claim 1, wherein the seat includes an undulated surface defining at least one valley portion, wherein the valley portion is engaged by the seal member when the seal member is in the first seated position, wherein the seal member is spaced from the valley portion when the seal member is in the second seated position, and wherein the leak path between the fuel pump and the fuel rail is defined between the seal member and the valley portion of the undulated surface of the seat.

5. The check valve of claim 1, wherein the seat includes a rough surface texture engaged by the seal member when the seal member is in the first seated position and in the second seated position, and wherein the leak path between the fuel pump and the fuel rail is defined between the seal member and the rough surface texture of the seat.

6. The check valve of claim 1, wherein the seal member is resiliently deformable, wherein the seal member includes at least one groove therein, wherein in the second seated position the groove is at least partially opened to provide the leak path between the fuel pump and the fuel rail in the second fuel-flow direction, and wherein in the first seated position the seal member is deformed to substantially close the groove to block the leak path.

7. The check valve of claim 6, wherein the at least one groove extends substantially radially with respect to the seal member.

8. The check valve of claim 1, wherein the biasing member includes a compression spring.

9. The check valve of claim 1, wherein the seal member is made from an elastomeric material.

10. The check valve of claim 9, wherein the seal member is made from a fluorocarbon rubber material.

11. The check valve of claim 1, wherein the seal member moves from the first seated position to the second seated position when the residual fuel pressure in the fuel rail drops to a pressure between about 10 kPa and about 100 kPa.

12. The check valve of claim 1, wherein in the second position the seal member substantially limits the flow of fuel in the second fuel-flow direction to about 14.4 mL/minute or less when the pressure in the fuel rail is about 10 kPa.

13. The check valve of claim 1, wherein the seat is resiliently deformed when the seal member is moved to the first seated position to block the leak path, and wherein the seat at least partially resumes its undeformed shape when the seal member is moved to the second seated position to provide the leak path.

14. A fuel system comprising:
a fuel pump operable to discharge pressurized fuel at an operating pressure;
a fuel rail that receives pressurized fuel from the fuel pump;
a body defining a passageway therein, the passageway having an inlet end in fluid communication with the fuel pump and an outlet end in fluid communication with the fuel rail such that pressurized fuel flows in a first fuel-flow direction from the inlet end of the passageway to the outlet end of the passageway during fuel pump operation;
a seat coupled to the body;
a seal member moveable relative to the seat and selectively engageable with the seat; and
a biasing member biasing the seal member toward the seat;
wherein the seal member is movable between an unseated position during fuel pump operation, a first seated position in which the seal member is engaged with the seat and the fuel pressure in the fuel rail is substantially equal to the operating pressure after the fuel pump has been turned off, and a second seated position in which the seal member is engaged with the seat and a residual fuel pressure in the fuel rail is substantially less than the operating pressure after the fuel pump has been turned off; and
wherein the seal member and the seat define a leak path between the fuel pump and the fuel rail permitting fuel to flow in a second fuel-flow direction opposite the first fuel-flow direction when the seal member is in the second seated position.

15. The fuel system of claim 14, wherein the seat defines a plane, and wherein the fuel system further includes a sealing surface spaced from the plane in the second fuel-flow direction and engaged by the seal member when the seal member is in the first seated position.

16. The fuel system of claim 15, wherein the seal member is spaced from the sealing surface when the seal member is in the second seated position, and wherein the leak path between the fuel pump and the fuel rail is defined between the seal member and the sealing surface.

17. The fuel system of claim 14, wherein the seat includes an undulated surface defining at least one valley portion, wherein the valley portion is engaged by the seal member when the seal member is in the first seated position, wherein the seal member is spaced from the valley portion when the seal member is in the second seated position, and wherein the leak path between the fuel pump and the fuel rail is defined between the seal member and the valley portion of the undulated surface of the seat.

18. The fuel system of claim 14, wherein the seat includes a rough surface texture engaged by the seal member when the seal member is in the first seated position and in the second seated position, and wherein the leak path between the fuel pump and the fuel rail is defined between the seal member and the rough surface texture of the seat.

19. The fuel system of claim 14, wherein the seal member is resiliently deformable, wherein the seal member includes at least one groove therein, wherein in the second seated position the groove is at least partially opened to provide the leak path between the fuel pump and the fuel rail in the second fuel-flow direction, and wherein in the first seated position the seal member is deformed to substantially close the groove to block the leak path.

20. The fuel system of claim 19, wherein the at least one groove extends substantially radially with respect to the seal member.

* * * * *